United States Patent
Sbuttoni et al.

(10) Patent No.: US 9,925,818 B2
(45) Date of Patent: Mar. 27, 2018

(54) WATERPROOF FABRIC WITH NO-SLIPPAGE FEATURES, IN PARTICULAR FOR OFFSET PRINTING BLANKET AND METHOD FOR MANUFACTURING THE SAME

(75) Inventors: Marco Sbuttoni, Bra (IT); Luca Burló, Turin (IT)

(73) Assignee: TECHNOFABRIC S.P.A., Costigliole Salazzo (IT)

( * ) Notice: Subject to any disclaimer, the term of this patent is extended or adjusted under 35 U.S.C. 154(b) by 1365 days.

(21) Appl. No.: 13/265,950

(22) PCT Filed: Apr. 23, 2010

(86) PCT No.: PCT/IB2010/051791
§ 371 (c)(1),
(2), (4) Date: Oct. 24, 2011

(87) PCT Pub. No.: WO2010/122524
PCT Pub. Date: Oct. 28, 2010

(65) Prior Publication Data
US 2012/0040576 A1 Feb. 16, 2012

(30) Foreign Application Priority Data
Apr. 24, 2009 (IT) ................ MI2009A0704

(51) Int. Cl.
*B32B 27/04* (2006.01)
*B41N 10/04* (2006.01)
(Continued)

(52) U.S. Cl.
CPC ............... *B41N 10/04* (2013.01); *B32B 7/02* (2013.01); *B32B 7/12* (2013.01); *B32B 27/08* (2013.01);
(Continued)

(58) Field of Classification Search
None
See application file for complete search history.

(56) References Cited

U.S. PATENT DOCUMENTS 2,271,125 A * 1/1942 Juve ................................ 442/65
5,079,097 A * 1/1992 Sasaki .................. B41M 5/5254
346/135.1
(Continued)

FOREIGN PATENT DOCUMENTS

EP 0002465 * 6/1979
JP 62 124993 A 6/1987

OTHER PUBLICATIONS

Machine translation of EP0002465 Weber et al. Jun. 1979.*
(Continued)

*Primary Examiner* — Shawn Mckinnon
(74) *Attorney, Agent, or Firm* — Abelman, Frayne & Schwab

(57) ABSTRACT

A waterproof fabric (20) made such by the application of a protective film (10), coupled or coated on a side of the fabric (20). When the film (10) is already produced by extrusion in advance, it is attached onto the fabric and may comprise an adhesive layer (12) to the extruded film, or the adhesive layer may be coated on the fabric (20). The water/oil repellent and waterproof fabric (20) may also be obtained by coating at least one layer of materials made up of fluorocarbon, polyurethane, acrylic resins, with or without the addition of hollow microspheres of thermoplastic material.

20 Claims, 2 Drawing Sheets

(51) Int. Cl.

| | |
|---|---|
| *B32B 7/02* | (2006.01) |
| *B32B 27/12* | (2006.01) |
| *B32B 7/12* | (2006.01) |
| *B32B 27/08* | (2006.01) |
| *B32B 27/18* | (2006.01) |
| *B32B 27/28* | (2006.01) |
| *B32B 27/30* | (2006.01) |
| *B32B 27/32* | (2006.01) |
| *B32B 27/34* | (2006.01) |
| *B32B 27/36* | (2006.01) |
| *B32B 27/40* | (2006.01) |

(52) U.S. Cl.
CPC .............. *B32B 27/12* (2013.01); *B32B 27/18* (2013.01); *B32B 27/285* (2013.01); *B32B 27/304* (2013.01); *B32B 27/32* (2013.01); *B32B 27/34* (2013.01); *B32B 27/36* (2013.01); *B32B 27/365* (2013.01); *B32B 27/40* (2013.01); *B32B 2307/306* (2013.01); *B32B 2307/538* (2013.01); *B32B 2307/714* (2013.01); *B32B 2307/7265* (2013.01); *B32B 2307/744* (2013.01); *B41N 2210/04* (2013.01); *B41N 2210/14* (2013.01); *Y10T 442/2172* (2015.04)

(56) References Cited

U.S. PATENT DOCUMENTS

| | | | |
|---|---|---|---|
| 5,753,568 A * | 5/1998 | Shimano | D06M 15/564 427/407.1 |
| 6,309,736 B1 * | 10/2001 | McCormack | A41D 31/0016 428/198 |
| 6,386,100 B1 | 5/2002 | Marshall et al. | |
| 6,491,977 B1 * | 12/2002 | Doesburg | D06N 3/0095 427/244 |
| 6,848,364 B1 * | 2/2005 | Byers | B41F 13/193 101/217 |
| 2002/0098761 A1 * | 7/2002 | Nishimoto | B32B 27/12 442/284 |
| 2007/0062394 A1 * | 3/2007 | Damewood | 101/376 |
| 2008/0070042 A1 * | 3/2008 | Byers et al. | 428/423.1 |
| 2008/0095978 A1 * | 4/2008 | Siqueira | A61F 13/4902 428/137 |

OTHER PUBLICATIONS

Hadiko et al. "Synthesis of Hollow, Calcium Particles by the Bubble Templating Method", Materials Letters, vol. 59, Issues 19-20, pp. 2519-2522, Aug. 2005.*

"Complete Textile Glossary" Celanese Acetate, 2001.*

* cited by examiner 1
2
3
4
5
6

20
10

11
12
10

10
10
20
10
20

WATERPROOF FABRIC WITH NO-SLIPPAGE FEATURES, IN PARTICULAR FOR OFFSET PRINTING BLANKET AND METHOD FOR MANUFACTURING THE SAME

FIELD OF THE INVENTION

The present invention relates to a fabric with no-slippage features, in particular for Offset Printing Blanket, and to a method for manufacturing the same.

PRIOR ART

Industrial applications are known wherein layers of natural or synthetic material are used, having water repellence and oil repellence features in order to form a barrier to the penetration of humidity, water and a wide range of liquids and solvents.

Some of the most renowned applications are in the field of conveyor belts, in the field of fabrics for abrasive tapes, in the field of fabrics intended for hospital use and also in fabrics for offset printing blankets.

In the case of offset printing, a set of layers, commonly called offset printing blanket, surrounds the printing cylinder. The outermost layer is a composite material, generally of fabric and rubber. For this reason, said set of layers or stratification is also called by the name of India rubber. Such outermost layer is intended to transfer the ink from a plate to the media to be printed, for example paper. Therefore, it is constantly in contact with the wetting water, with the inks and the washing solvents of the rubber surface carrying the ink.

An offset printing blanket or India rubber is generally made of a casing comprising one or more layers of fabric and rubber, generally, also a compressible layer in order to improve the ink transfer to the media. FIG. 1 of the prior art shows a section of said set of layers covering a printing cylinder. In particular, the outermost layer 1 shows, externally, a side intended for contacting the liquids, oils and solvents, coated with a special rubber mixture with intrinsic solvent resistance capability for carrying out the function of appropriately transferring the ink onto the surface to be printed. Other underlying layers may comprise fabric layers 2, 4, 6 spaced out by other layers 3, 5 for example of rubber.

It is important to protect the inner layers of the blanket, especially those of fabric 2, 4 and 6 of FIG. 1, from the penetration of liquids present and used in printing for preventing the absorption thereof which would cause the swelling of the blanket, impairing the performance and the duration of the same.

One of the methods commonly used for limiting such harmful effects is that of using fabrics impregnated with fluorocarbon resins for making one or more blanket layers, so that they are water repellent and oil repellent.

Very often, the innermost layer 6 of FIG. 1, called bottom or "bottom face" fabric, is immersed beforehand in a waster bath containing a fluorocarbon resin and then caused to dry and/or crosslink in a drier or furnace.

The fabric thus treated is water repellent and oil repellent, but does not prevent being crossed by liquids, although it is not impregnated. In other words, the fabric thus treated is oil repellent or water repellent but not waterproofing. In fact, only the fabric fibres are coated with water/oil repellent product, whereas the spaces between one thread and the other of the same fabric remain open to the crossing of liquid.

Moreover, the use of a fabric thus treated makes the adhesion of a rubber layer thereon poor, such as for example layer 5. For this reason, it is necessary to use an adhesive rubber layer on a treated fabric layer. Such solution is forced because the offset printing blanket should not delaminate during its rotation on the printing machine cylinder.

An offset printing blanket is for example known from JP-62/124993-A with the bottom face of the same treated on both faces with water/oil repellent material for preventing the penetration of liquids into the product. This treatment, however, does not ensure the absence of side movement or slippage (anti-slippage) of the offset printing blanket on the printing cylinder.

In fact, another problem resulting from a blanket thus made relates to the possible side slipping of the blanket on the printing cylinder. A problem known by the term of "slippage" or "slipping", which leads to problems in printing. In fact, it may happen that an edge of the media is not properly printed or the same media may be subject to efforts that cause the breakage thereof.

It is important to define the slipping resistance values of the blanket on the printing cylinder to prevent generating problems of difficult tensioning of the offset printing blanket on the printing cylinder due to the excessive grip of the same bottom fabric.

In order to prevent such slippage or slipping of the offset printing blanket, it is known to use a polyester sheet as underpacking, with an embossed/rough surface facing the bottom fabric of the printing blanket. An alternative is to apply a cross adhesive resin/latex strip.

Therefore, the main technical problem of preventing the penetration of liquids, solvents and inks in the blanket, with the use of water/oil repellent obtained by impregnating the fabrics determines a secondary problem that is that of the side slippage or slipping of the offset printing blanket.

Other embodiments of waterproof fabric are known which do not ensure anti-slippage features.

For example, WO/2008/022306-A2 describes the application of one or two barrier layers arranged underneath the printing surface of an offset printing blanket, opposite the bottom face for preventing the washing liquids and the printing inks from crossing the printing surface (top) and penetrating the inner layers, thus swelling them. These barrier layers are obtained by inserting mineral charges coated with fluorinated compounds or silanes to a rubber mixture. In this case, however, they are not fabrics coated or coupled with films and no reference is made to any protection of the bottom fabric.

DE-102004037904-A1 also describes a special Offset Printing Blanket that uses a metal sheet as bottom layer. A film of plastic material is applied underneath the printing surface to prevent the penetration of solvents and inks in the top portion of the offset printing blanket.

EP-1857265-A describes a fabric with well defined yarn, weft, warp and construction features for the clothing field, whereon a porous and transpiring film of polytetrafluoroethylene with oil-repellent features is applied. Said fabric is not suitable for the application on offset Printing Blanket. In fact, no mention is made to the feature of preventing the solvent penetration.

SUMMARY OF THE INVENTION

The object of the present invention is to solve the above problem of obtaining a waterproof fabric which at the same time is rough or in any case with anti-slippage features.

The object of the present invention is a waterproof fabric, in particular for offset printing blanket, which according to claim 1, comprises a fabric layer on a side whereon there is applied a fully waterproofing and non transpiring protective film. Another object of the present invention is to provide a method for manufacturing a waterproof fabric particularly suitable for the use in an Offset Printing Blanket, so as to protect it from the penetration of liquids, oils and printing inks and insensitive to the problem of slipping or slippage.

Advantageously, a fabric according to the present invention comprises a protective film applied or coated on a single side of the fabric, so that the fabric is waterproof on the one side and sufficiently rough on the other side, ensuring the necessary resistance to solvents and the anti-slippage features.

The dependent claims describe preferred embodiments of the invention.

BRIEF DESCRIPTION OF THE DRAWINGS

Further features and advantages of the invention will appear more clearly from the detailed description of preferred, but not exclusive, embodiments of a waterproof fabric and a method for obtaining the same, illustrated by way of a non-limiting example with the aid of the accompanying drawing tables, wherein:

FIGS. 5 and 6 show the use of a coating blade whereas in FIG. 7, one of the two conveyor rollers of a fabric is partially immersed in a resin.

The same reference numerals and letters in the figures identify the same functional components or equivalents.

DETAILED DESCRIPTION OF EXEMPLARY EMBODIMENTS OF THE INVENTION

Figure 1:
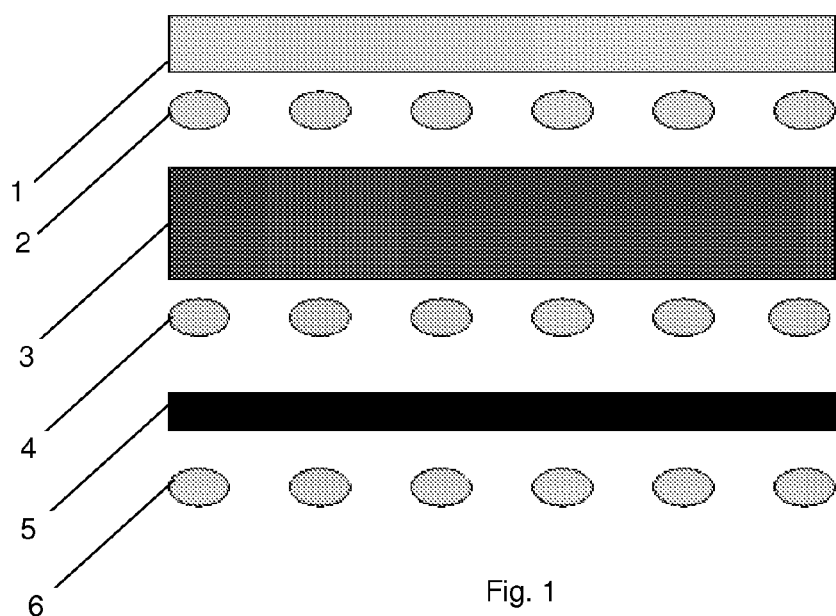
FIG. 1 of the prior art schematically shows a section of a blanket, from the outermost 1 to the innermost layer 6, and with the fabric layers represented by means of ovals and the other layers represented by means of solid rectangles.
Figure 2:
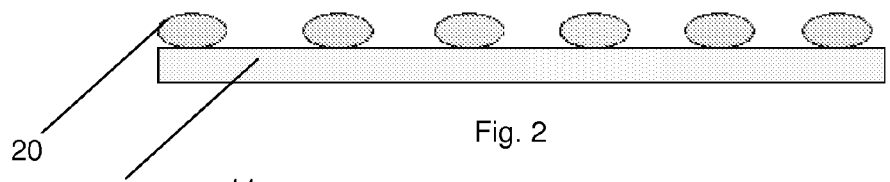
FIG. 2 shows a fabric whereto a thin insulating film is attached.
Figure 3:
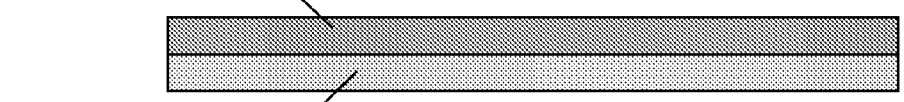
FIG. 3 shows an insulating film comprising an adhesive layer functional to the attachment of a fabric.

According to a first variant, a fabric 20 according to the present invention comprises a protective waterproof film 10 of solid water/oil repellent material applied on a side of fabric 20.

Such protective film 10, having a thickness comprised between 5 microns and 100 microns, may be formed of thermoplastic materials such as polyurethanes, polyethers or polyesters, polycarbonate, polyethylene, nylon, polyvinyl chloride.

The waterproof protective layer 10 preferably is a dual layer (bi-layer), obtained by a per se known blown film coextrusion process, with two different softening points or thermal resistance: one layer 11 with softening values comprised between 110° C. and 130° C., and a second layer 12 with a much higher softening point, 160° C.-180° C. Layer 11 of the film with lower softening point contacts the fabric to ensure the adhesion thereof to the same; the second layer 12 with higher softening point serves for ensuring a better resistance to solvents.

The preferred thickness of the two-layer film is comprised between 30 microns and 80 microns.

The thickness of the two layers is generally equal, 50% of the total film thickness.

The calendering process is preferably carried out in hot with cylinder heated to around 120° C., using very high pressures, comprised between 50 and 100 Kg/cm$^2$, for ensuring a high mechanical adhesion of the film to the fabric while perfectly coating weft and warp threads, penetrating the structure of the fabric.

The calendering speed is very low, 3-5 meters a minute to contribute to the adhesion and to the film penetration into the fabric structure.

Figure 4:
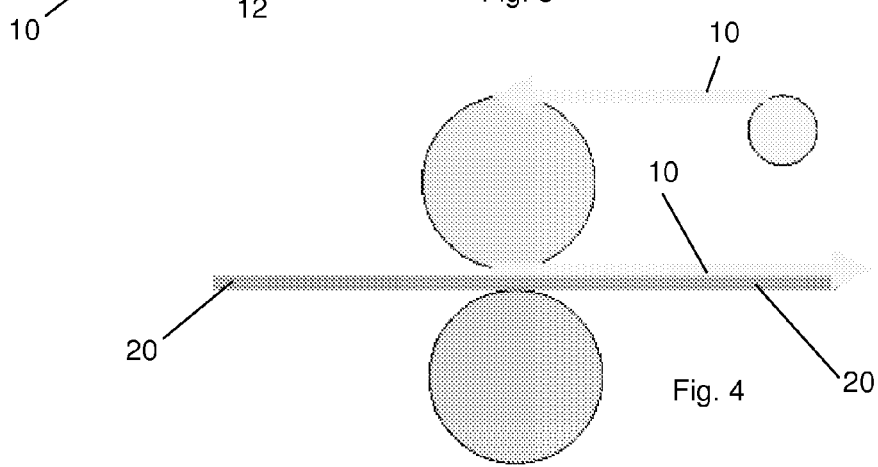
FIG. 4 shows a process for attaching a fabric and a protective film.

The attachment of the two-layer film 10 to fabric 20 may be obtained by hot or cold calendering, based on the type of adhesive and/or film used, as shown in FIG. 4. According to another preferred embodiment, the protective film comprises a single solid layer, obtained by blown film extrusion, with equivalent features to those of the second layer 12 described above, applied on fabric 20 through coating of thermoplastic or thermosetting resin on the fabric itself, and subsequent coupling through calendering. The calendering may be of the hot type described above.

According to a second variant of the invention, the water/oil repellent and anti-slippage feature, as mentioned above, may also be obtained by coating with one or more coats of liquid materials with water/oil repellent features on fabric 20.

The liquid material may comprise:
a fluorocarbon resin, or
a fluorocarbon resin and polyurethane resin, that is, polyester, polyether or polycarbonate, or
a fluorocarbon resin and acrylic resin, or
a fluorocarbon resin and polyurethane resin, that is, polyester, polyether or polycarbonate.

Moreover, microspheres of a plastic nature may be added to the liquid material, which may be hollow and with various grain sizes (for example of the Expancel or Dualite type), in order to lighten the weight and decrease the amount of material required while modifying the roughness thereof.

Before coating, the fabric must be washed and purged in order to remove the polish and the greasy substances present on the yarn of the same, and better absorb the coating solution.

Thereafter, a calendering treatment is also carried out for making the fabric flatter and closed so as to make the material lying more homogeneous.

Preferably, the coating is carried out into two steps; a first step serves for filling the fabric porosity, and a second step serves for imparting water/oil repellence and anti-slippage features.

By the first step, 15-20 grams per m$^2$ of material, for example thermoplastic or thermosetting resin, are usually laid, depending on the fabric structure. The material laid on the fabric is made to pass in a heated furnace for the complete water evaporation, taking care not to trigger the resin cross-linking which would make a second coating step difficult. For example, for a 20 meter long furnace, the passage speed of the fabric into the furnace is generally comprised between 12 and 15 meters a minute with an average temperature comprised between 120° C. and 140° C. on the fabric.

With further coating steps, about 5-10 grams per m$^2$ of thermoplastic or thermosetting resin with water/oil repellence features are laid.

During these further passages into the furnace, the temperature on the fabric reaches 170° C. for a time of 2 min, for allowing the cross-linking of the laid material.

Figure 5:
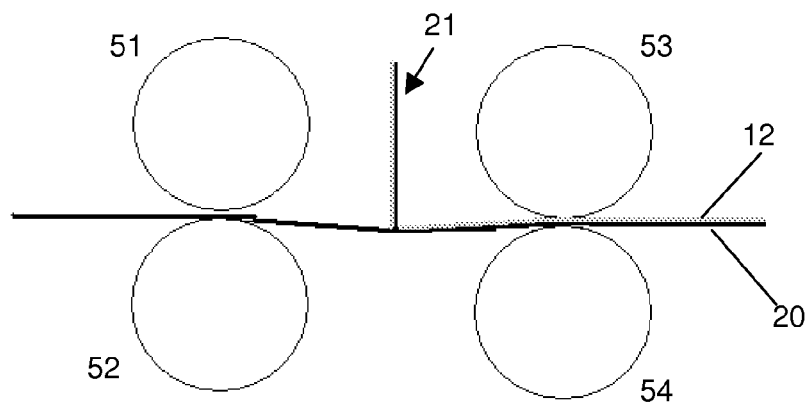
FIGS. 5, 6 and 7 show processes for coating an adhesive layer on a protective film intended to be attached onto a fabric or the coating of a thin film directly on a fabric to be made waterproof. In particular.
Figure 6:
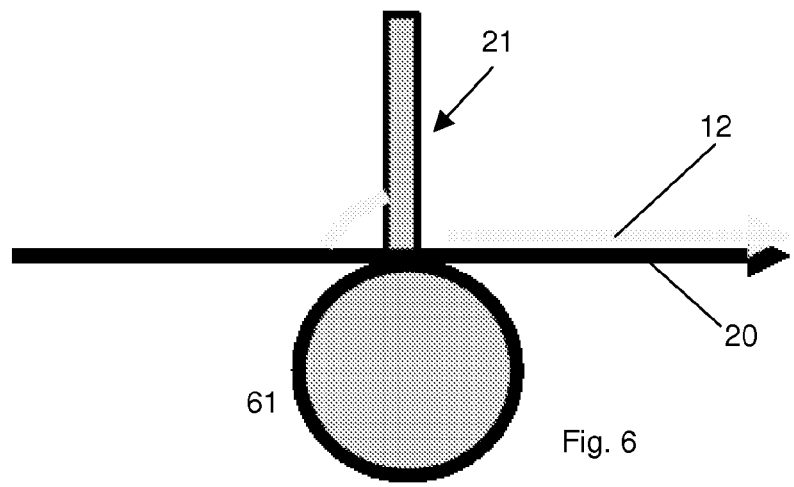
Figure 7:
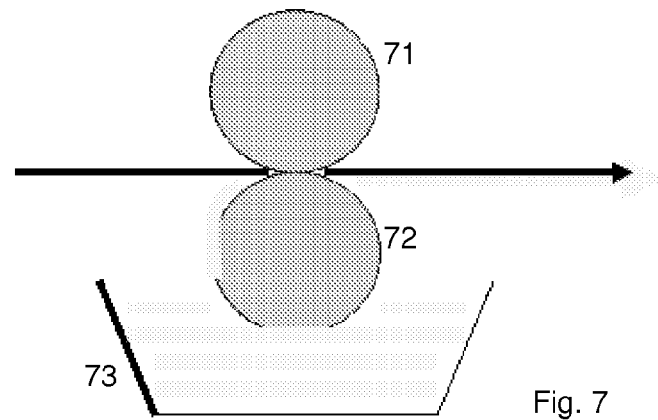

Examples of method of application of such thermoplastic or thermosetting resin are shown in FIGS. 5, 6 and 7.

In particular, FIGS. 5 and 6 show the application of such resin 12 by a coating blade 21 which touches fabric 20, coating a resin layer thereon. In particular, the fabric may be pulled by two pairs of rollers 51, 52, 53, 54, and the coating blade may operate alone without any opposition (FIG. 5), or with the opposition of a further roller 61.

FIG. 7 shows a coating process wherein two rollers 71, 72 operate in a reverse manner for pulling a fabric 20, and one roller of the two (72) is partly immersed in said thermoplastic or thermosetting resin 73, so that fabric 20 or the protective film 10 remains coated on one face only with said resin.

The man skilled in the art knows several ways for coating such resin on a fabric layer. Screen-printing techniques may also be used, wherein said resin is used in place of inks and coatings.

The above mentioned microspheres, if present, may first be added not yet foamed, and are foamed during the step of passage into the furnace during the coating, drying and final cross-linking of the resins.

The component percentage may vary based on the desired value of water/oil repellence and softness of the fabric itself.

The water/oil repellence treatment may be preceded or followed by a further calendering operation of the fabric in order to obtain the proper end thickness of the same after the water/oil repellence treatment and a higher or lower stiffness and roughness.

The oil repellence resistance of the fabric is measured by assessing the absorption time of one drop of n-decane laid on the fabric surface. The ideal penetration resistance value is 3 minutes before the drop is absorbed by the fabric.

The anti-slippage feature of the fabric may be assessed, for example, by measuring the force that a steel square slide with 1.5 micron roughness (Ra), side equal to one inch (25.2 mm) and 3 mm thickness, encounters in moving at the speed of 100 mm/min on the fabric surface. The average value of the ideal force required is comprised between 2.5 to 5.0 grams force.

For all the variants described above, the fabric may be of the type commonly used for application on Offset Printing Blanket, thus for example consisting of cotton, or cotton-polyester, or cotton-polynosic, or polynosic or any other textile fibre.

The fabric object of the present invention may therefore be obtained by attaching a pre-calendered-extruded film consisting of materials such as PU, TPU, PVC, FPV, nylon, PET, TPE, and other similar ones, or by surface coating of one or more layers of materials consisting of fluorocarbon, polyurethane, acrylic resins, with or without the addition of hollow microspheres of thermoplastic material.

The advantages of the application of the present invention are clear.

In particular, a fabric is made waterproof besides water repellent and oil repellent by the application of a protective film, either attached or coated on a fabric side, leaving a protective and waterproofing thin film on the fabric, without the fabric being completely impregnated and thus without losing, at least on one side, the roughness required to prevent slippage phenomena.

The elements and the features shown in the different preferred embodiments may be combined without departing from the scope of protection of the present application.

The particular embodiments described herein do not limit the contents of this application that covers all the embodiment versions as defined by the claims.

The invention claimed is:

1. An anti-slip woven fabric having first and second sides and a waterproofing and water/oil-repellant protective film adhered to only one of said sides,
   wherein said protective film is applied to the fabric by:
   (a) calendaring the fabric layer with a film of polyurethane, polyether, polyester, nylon, polyethylene or polyvinyl chloride, or
   (b) coating the fabric layer with one or more of a fluorocarbon resin, a polyurethane or an acrylic resin,
   said protective film having a thickness in the range of from 5 to 100 microns,
   said protective film, either calendered or coated, weighing from 20 to 30 grams per $m^2$, the fabric not being completely impregnated and thereby retaining its intrinsic roughness to prevent slippage as measured by an anti-slip force of between 2.5 and 5.0 grams force when a steel square slide with a roughness (Ra) of 1.5 microns and having 1 inch (25.4 mm) sides and a thickness of 3 mm, moves at a rate of 100 mm/min on the surface of the fabric opposite the protective film,
   where said protective film is solid and comprises two layers having different thermal resistance values,
   wherein the first layer applied to the fabric surface has a thermal resistance value selected to ensure secure adhesion to said fabric surface, and wherein the second layer is adhered to the first layer and has a thermal resistance value that has a predetermined solvent resistance and the thermal resistance value of the second layer is selected to provide a softening point between 160° C. and 180° C., and the first layer has a softening point between 110° C. and 130° C.

2. A method for producing an anti-slip fabric according to claim 1, said method comprising the steps of:
   coating a first layer of waterproofing and water/oil-repellent film comprising resins on one side only of said fabric layer for filling the fabric porosity;
   in a first heating step, heating said coated fabric layer in a furnace under conditions for drying said first layer without cross-linking the resins;
   coating said first layer with one or more additional layers of waterproofing and water/oil-repellent film comprising resins; and
   in a second heating step, heating the coated fabric layer in a furnace under conditions for final cross-linking the resins.

3. The method of claim 2, wherein in said first heating step the coated fabric layer is moved through a heated chamber approximately 20 m long at a speed of approximately 15 meters a minute, and wherein the temperature within the heated chamber on the fabric is approximately 130° C.

4. The method of claim 2, wherein the second heating step takes place at a temperature of approximately 170° C. on the fabric for approximately 2 minutes, for allowing the final cross-linking of the resins.

5. The method of claim 3, wherein the second heating step takes place at a temperature of approximately 170° C. on the fabric for approximately 2 minutes, for allowing the final cross-linking of the resins.

6. The method of claim 2, wherein at least one of said layers includes non-foamed microspheres, said wherein second heating step comprises the foaming of said microspheres.

7. The method of claim 2, wherein prior to the first coating, a washing-purging treatment is carried out on the fabric layer in order to remove any polish and greasy substances which may be present on the fabric, thereby improving the absorption of liquid material.

8. The method of claim 7, wherein after said washing-purging step, a calendering of the fabric is carried out.

9. The method of claim 2, further comprising the step of measuring the water/oil repellence resistance value of the fabric, assessing the absorption time of one drop of n-decane laid on the fabric surface.

10. The method of claim 2, further comprising the step of assessing the anti-slippage characteristics of the fabric using a dynamometer, measuring the force that a steel square slide (with a 25.2 mm side) with 1.5 micron roughness (Ra) and 3 mm thickness encounters n moving at the speed of 100 mm per minute on the surface of the treated fabric.

11. A method for producing an anti-slip fabric according to claim 1, comprising the steps of:
providing a fabric layer having first and second sides;
providing a solid waterproofing and water/oil-repellant protective film; and
adhering said solid protective film to one of said sides by calendering.

12. The method of claim 11, wherein said protective film comprises a first and second layer obtained by blown film coextrusion with a steel cylinder heated to a temperature of approximately 120° C.

13. The method of claim 11, wherein the calendering is carried out at a pressure between 50 and 100 kg/cm$^2$, and at a speed between 3 and 5 meters per minute.

14. The method of claim 11, wherein said protective film comprises two layers with different thermal resistances; wherein a first said layer is adhered to said one side of said fabric layer and has a thermal resistance such as to ensure adhesion to said fabric layer, and wherein a second said layer is adhered to said first said layer and has a thermal resistance such as to ensure proper solvent resistance.

15. The method of claim 14, wherein said second layer is provided with a thermal resistance (softening point) between 160° C. and 180° C., wherein said first layer is provided with a thermal resistance (softening point) between 110° C. and 130° C.

16. The method of claim 15, wherein said solid protective film has a total thickness in the range of 30-80 microns.

17. The method of claim 16, wherein said first and second layers have equal thickness.

18. The method claim 11, wherein said solid protective film comprises one or more of the following materials: polyurethane, polyether, polyester, or nylon, polyethylene, polyester, polyvinyl or chloride.

19. A printing blanket comprising the anti-slip fabric according to claim 1.

20. The printing blanket of claim 19, where the anti-slip fabric is the bottom layer.

* * * * *